United States Patent [19]
Delanty et al.

[11] Patent Number: 5,842,496
[45] Date of Patent: Dec. 1, 1998

[54] HOT TAP CONNECTION AND METHOD FOR PRODUCTION THEREOF

[75] Inventors: Joseph Delanty, Bracebridge; Burke Delanty; Trevor MacFarlane, both of Calgary, all of Canada

[73] Assignee: TransCanada Pipelines Limited, Calgary, Canada

[21] Appl. No.: 775,641

[22] Filed: Dec. 31, 1996

[51] Int. Cl.$^6$ .......................... F16K 43/00; B29C 27/00
[52] U.S. Cl. .............................. 137/15; 156/86; 156/295; 156/303.1; 156/305; 137/318; 264/32; 264/36; 264/262; 285/21.3; 285/197
[58] Field of Search ................ 137/15, 318; 285/21.1, 285/21.3, 197; 156/86, 165, 213, 295, 303.1, 305; 264/32, 36, 262

[56] References Cited

U.S. PATENT DOCUMENTS

| | | | |
|---|---|---|---|
| 3,686,375 | 8/1972 | Hall | 264/32 |
| 3,799,182 | 3/1974 | Long | 137/318 |
| 3,847,694 | 11/1974 | Stewing | 156/86 |
| 3,905,718 | 9/1975 | Luckenbill et al. | 137/318 |
| 4,223,925 | 9/1980 | Reneau et al. | 285/197 |
| 4,606,558 | 8/1986 | Davidson | 285/197 |
| 4,832,069 | 5/1989 | Gale et al. | 137/318 |
| 4,978,255 | 12/1990 | Gale et al. | 137/318 |

OTHER PUBLICATIONS

Along the Line, vol. 9 No. 1, Jan./Feb. 1996.

*Primary Examiner*—George L. Walton
*Attorney, Agent, or Firm*—Taylor & Associates, P.C.

[57] ABSTRACT

A hot tap connection comprising: (i) a main supply pipe, (ii) a side branch pipe connected to the main supply pipe, (iii) a reinforcing saddle surrounding the main supply pipe and the side branch pipe, (iv) a first gap between the main supply pipe and the reinforcing saddle, (v) a second gap between the side branch pipe and the reinforcing saddle, and (vi) a solid material substantially filling the first gap and the second gap. The method for producing the hot tap connection is also described. The method comprises the steps of: (i) connecting a side branch pipe to a desired location on a main supply pipe; (ii) surrounding the side branch pipe and the main supply pipe with a reinforcing saddle; (iii) defining a first gap between the main supply pipe and the reinforcing saddle, and a second gap between the side branch pipe and the reinforcing saddle; (iv) injecting a pumpable material into the first gap and the second gap; (v) curing the pumpable material to produce a solid material; (vi) cutting a coupon of the main supply pipe within the side branch pipe to produce an opening in the main supply pipe to allow gas to flow therethrough; (vii) removing the coupon from the side branch pipe. The hot tap connection is advantageous as, in most installations, it can be used as a permanent connection between a main supply pipe and a side branch pipe.

19 Claims, 4 Drawing Sheets

HOT TAP CONNECTION AND METHOD FOR PRODUCTION THEREOF

BACKGROUND OF THE INVENTION

1. Field of the Invention

The present invention relates to a hot tap connection and to a method for production thereof.

2. Description of the Prior Art

Hot tap connections are generally known in the art.

Specifically, in the pipeline art it is known to transport large amounts of gas via pipelines consisting of a network of main supply pipes. Occasionally, a need arise to make a connection to the main supply pipe (e.g. for sales take-off points and tie-over points for partially or fully looped lines).

Generally, the connection can be made as a "hot tap" connection or a "cold" connection.

Hot tap connections are known in the art and involve effecting the side branch pipe connection while the main supply pipe is in use (i.e. while the main supply pipe is "hot"). Cold connections involve turning off the main supply pipe to facilitate installation of a fabricated tee to which is attached the side connection.

When making a hot tap connection, it is conventional to use a reinforcing saddle surrounding portions of the main supply pipe and the side-branch pipe in the area of the junction between the two pipes. Unfortunately, in conventional hot tap connections, there may be a significant gap present between the reinforcing saddle and the main supply pipe/side branch pipe. In some cases, this gap may be ⅛ inch to ⅜ inch. In consequence, moisture may enter the gap and facilitate corrosion of the reinforcing saddle thereby weakening the overall hot tap connection. The practical result of this is that most conventional hot tap connections have been considered no more than temporary connections. Once the service life (normally approximately 5 years) of the hot tap connection is reached, it is necessary to replace the hot tap connection with a cold connection—i.e. necessitating shutdown of the entire main supply feed for that section of the pipeline. Thus, current hot tap connection technology may be regarded as a means to defer, but not replace, the need to effect a cold connection and the associated costs. Indeed, current costs for effecting a hot tap connection and replacing it with a cold connection range from CDN$70,000–CDN$100,000, per connection.

Accordingly, there remains a need in the art for an improved hot tap connection. Specifically, the art is in need of a hot tap connection with a longer service life. Ideally, the hot tap connection would have a service life approaching that of a cold connection.

SUMMARY OF THE INVENTION

It is an object of the present invention to provide a novel hot tap connection which obviates or mitigates the above-mentioned disadvantages of the prior art.

It is another object of the present invention to provide a novel method for producing a hot tap connection which obviates or mitigates the above-mentioned disadvantages of the prior art.

Accordingly, in one of its aspects, the present invention providing a hot tap connection comprising; (i) a main supply pipe, (ii) a side branch pipe connected to the main supply pipe, (iii) a reinforcing saddle surrounding the main supply pipe and the side branch pipe, (iv) a first gap between the main supply pipe and the reinforcing saddle, (v) a second gap between the side branch pipe and the reinforcing saddle, and (vi) a solid material substantially filling the first gap and the second gap.

In another of its aspects, the present invention provides a method for producing a hot tap connection comprising the steps of:

(i) connecting a side branch pipe to a desired location on a main supply pipe;

(ii) surrounding the side branch pipe and the main supply pipe with a reinforcing saddle;

(iii) defining a first gap between the main supply pipe and the reinforcing saddle, and a second gap between the side branch pipe and the reinforcing saddle;

(iv) injecting a pumpable material into the first gap and the second gap;

(v) curing the pumpable material to produce a solid material;

(vi) cutting a coupon of the main supply pipe within the side branch pipe to produce an opening in the main supply pipe to allow gas to flow therethrough;

(vii) removing the coupon from the side branch pipe.

BRIEF DESCRIPTION OF THE DRAWINGS

Embodiments of the present invention will be described with reference to the accompanying drawings in which.

DETAILED DESCRIPTION OF THE PREFERRED EMBODIMENTS

Figure 1:
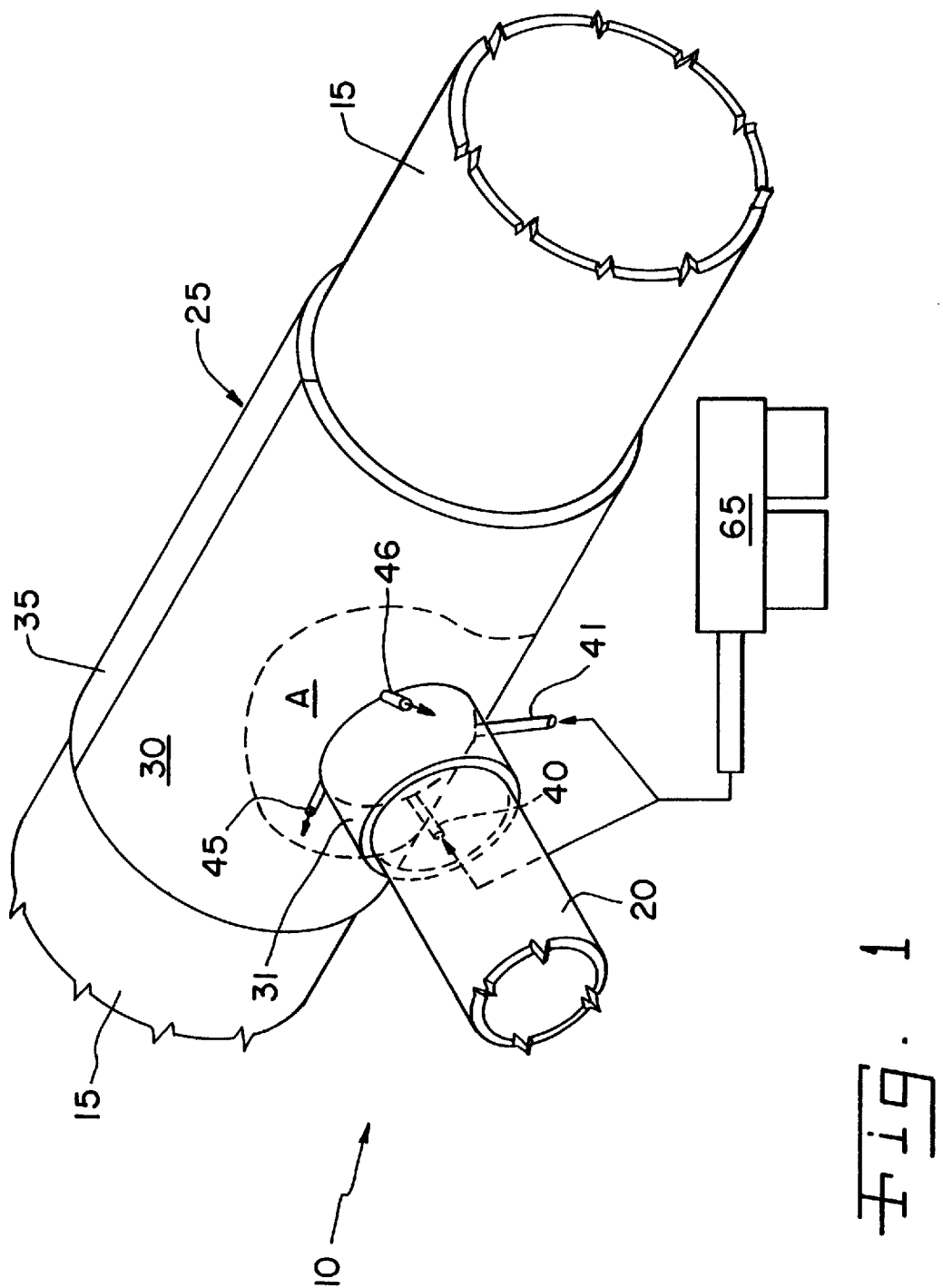
FIG. 1 is a perspective view of a hot cap connection in accordance with an embodiment of the present invention.

With reference to FIG. 1, there is illustrated a hot tap connection 10. Hot tap connection 10 comprises a main supply pipe 15 and a side branch pipe 20. Surrounding a portion of main supply pipe 15 and side branch pipe 20 is a reinforcing saddle 25.

Reinforcing saddle 25 comprises a front half 30 and a back half 35. Reinforcing saddle 25 further comprises a pair of inlets 40,41 and a pair of bleeder points 45,46. As will be evident from FIG. 1, front half 30 of the reinforcing saddle 25 surrounds a portion of main supply pipe 15 and comprises a sleeve 31 for receiving a portion of side branch pipe 20.

Figure 4:
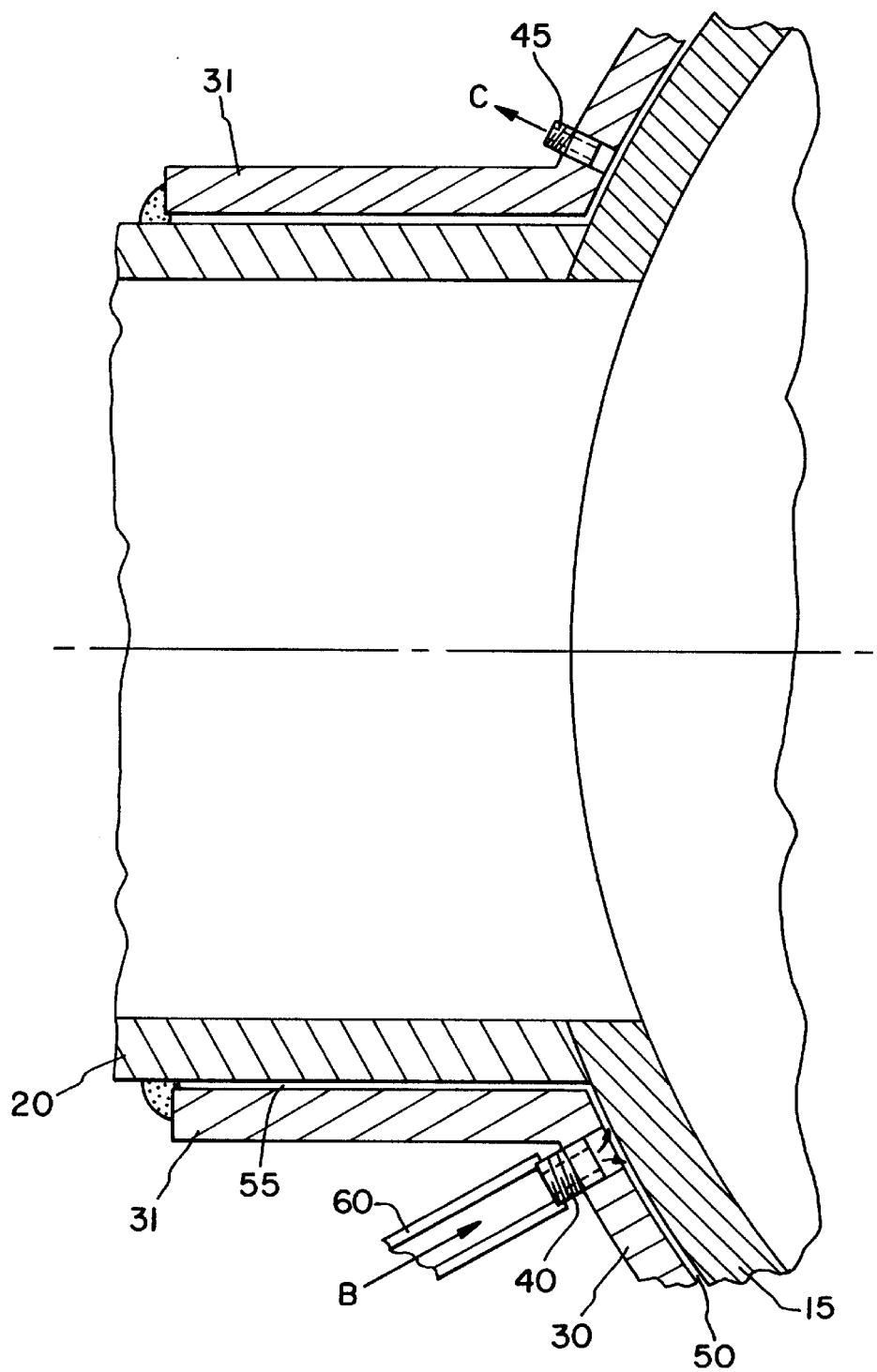

With reference to FIG. 4, the provision of first half 30 of reinforcing saddle 25 defines a first gap 50 between first half 30 of reinforcing saddle 25 and main supply pipe 15. A second gap 55 is also formed between sleeve 31 of first half 30 of reinforcing saddle 25 and side branch pipe 20.

First gap 50 and second gap 55 are substantially completely filled with a material having a compressive strength of at least about 10,000 psi. As used throughout this specification, the term "compressive strength" is intended to mean the compressive force which a material is capable withstanding prior to failure. In this instance, it is preferred that the material used in first gap 50 and second gap 55 is a solid which hardens from substantially non-shrinkable, pumpable material. Examples of such materials include resin material, cement-based materials and the like. The preferred material is a resin material. The nature of this resin material is not particularly restricted. Preferably, the resin material is obtained in a fluid form which facilitates injection thereof (described in detail herein below) into first gap 50 and second gap 55, and is capable of curing to become a solid material having the desired compressive strength.

Preferably, the resin material is an epoxy resin. Preferably, the resin contains a filler.

It is generally preferred to dispose the solid material in first gap 50 and second gap 55 in a region corresponding to substantially all of first half 30 of reinforcing saddle 25. However, the benefits of the invention may also be achieved if the solid material is disposed in a portion of the region corresponding to first half 30 of reinforcing saddle 25. Specifically, a useful hot tap connection can be made if substantially all of second gap 55 is filled with the solid material and a portion of first gap 50 corresponding to region A in FIG. 1 is filled with resin material.

The present hot tap connection can be produced by a method comprising the steps of:

(i) connecting a side branch pipe to a desired location on a main supply pipe;

(ii) surrounding the side branch pipe and the main supply pipe with a reinforcing saddle;

(iii) defining a first gap between the main supply pipe and the reinforcing saddle, and a second gap between the side branch pipe and the reinforcing saddle;

(iv) injecting a pumpable material into the first gap and the second gap;

(v) curing the pumpable material to produce a solid material;

(vi) cutting a coupon of the main supply pipe within the side branch pipe to produce an opening in the main supply pipe to allow gas to flow therethrough;

(vii) removing the coupon from the side branch pipe.

Thus, the initial step of the present method comprises connecting a periphery of side branch pipe 20 to a desired location on main supply pipe 15. The nature of this connection is not particularly restricted and is within the purview of a person of ordinary skill in the art. For example, it is possible to weld side branch pipe 20 to the desired location of main supply pipe 15. As will be appreciated by those of skill in the art, at this point in the process, main supply pipe 15 has not been breached.

Next, reinforcing saddle 25 is affixed to main supply pipe 15. Preferably, this is achieved by using the "split" saddle comprising first half 30 and second half 35 illustrated in FIG. 1 (of course other saddle configurations are possible). Reinforcing saddle 25 conventionally is constructed of steel and is affixed, preferably by welding in place, around main supply pipe 15. Further, sleeve 31 of first 30 of reinforcing saddle 25 may be welded around side branch pipe 20.

At this point, a pumpable material capable of curing into the solid material discussed above is injected into first gap 50 and second gap 55 (preferably, the pumpable material is an uncured epoxy resin). This may be achieved by connecting a hose 60 to inlets 40,41. The pumpable material may then be injected into first gap 50 and second gap 55 via a pressurized injector 65. Preferably, injector 65 is capable of providing a feed of the pumpable material at a pressure which will substantially fill first gap 50 and second gap 55 with the pumpable material in a relatively short period of time. The principal reason for this is that the preferred resin material is a two-part system comprising a resin part and a catalyst part which, when mixed, form a resin material mixture which will cure within minutes. Thus, the injector should of be capable of quickly and efficiently injecting the raked system into first gap 50 and second gap 55. The precise pressure used to inject the pumpable material is not particularly restricted and depends, at least in part on the dimension of first gap 50 and second gap 55. Generally, for a given injection period, the smaller the dimension of first gap 50 and second gap 55, the higher the pressure needed to inject the pumpable liquid. It is been found that, for gap dimensions in the range of from about ⅛ inch to about ⅜ inch, an injection pressure of up to about 125 psi, preferably in the range of from about 50 to about 125 psi will suffice.

Preferably, the injection is effected by injecting pumpable material into first gap 50 and second gap 55 in a direction of arrow B (FIG. 4) until such time as pumpable material exists bleeder points 45,46 via arrow C (FIG. 4). At this point, it is preferred to seal bleeder points 45,46 (e.g. by capping) while continuing to inject pumpable material through inlets 40,41. This facilitates efficient filling of first gap 50 and second gap 55 with the pumpable material.

Once the pumpable material has been injected into first gap 50 and second gap 55, it cures in these gaps the solid material discussed above.

Figure 2:
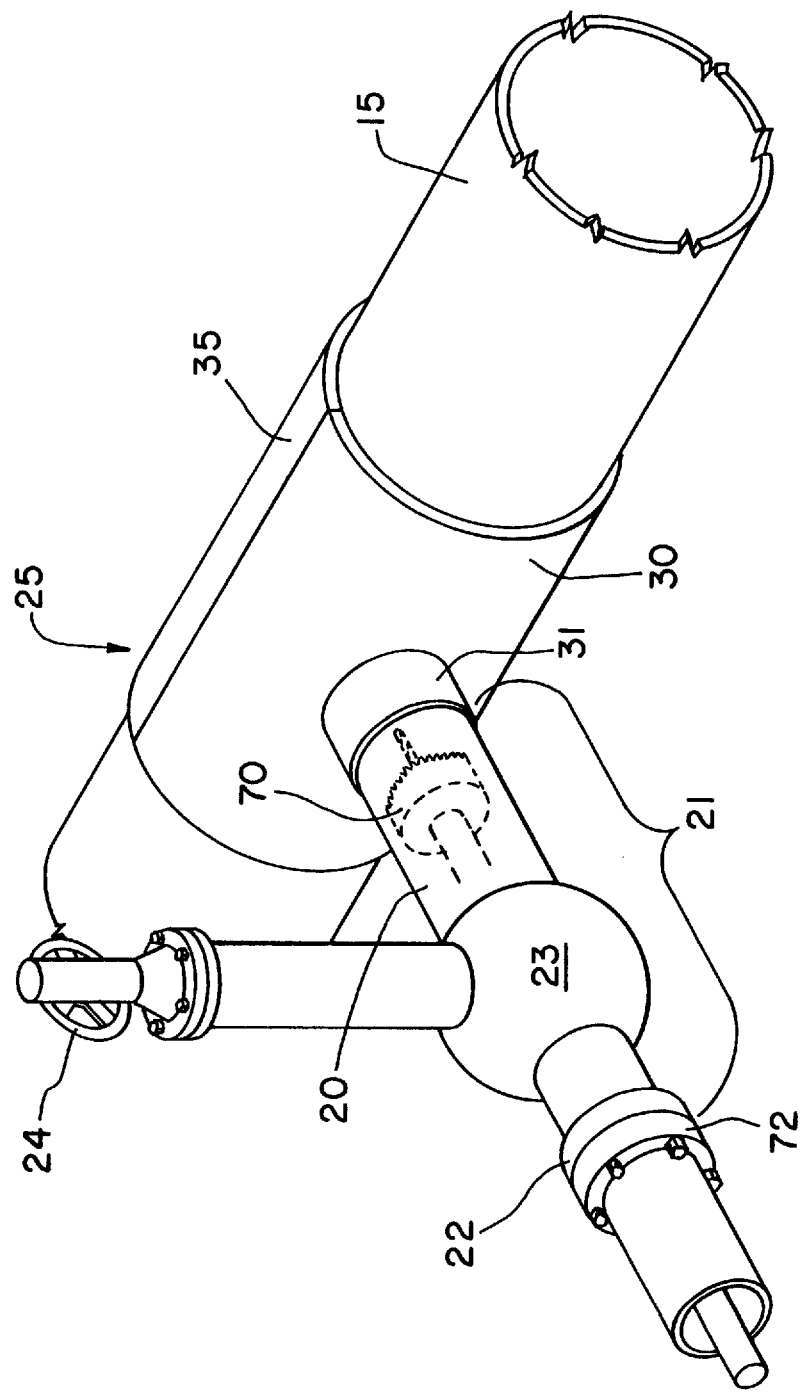
FIGS. 2–4 illustrate various steps in an embodiment of the method to produce the present hot tap connection.
Figure 3:
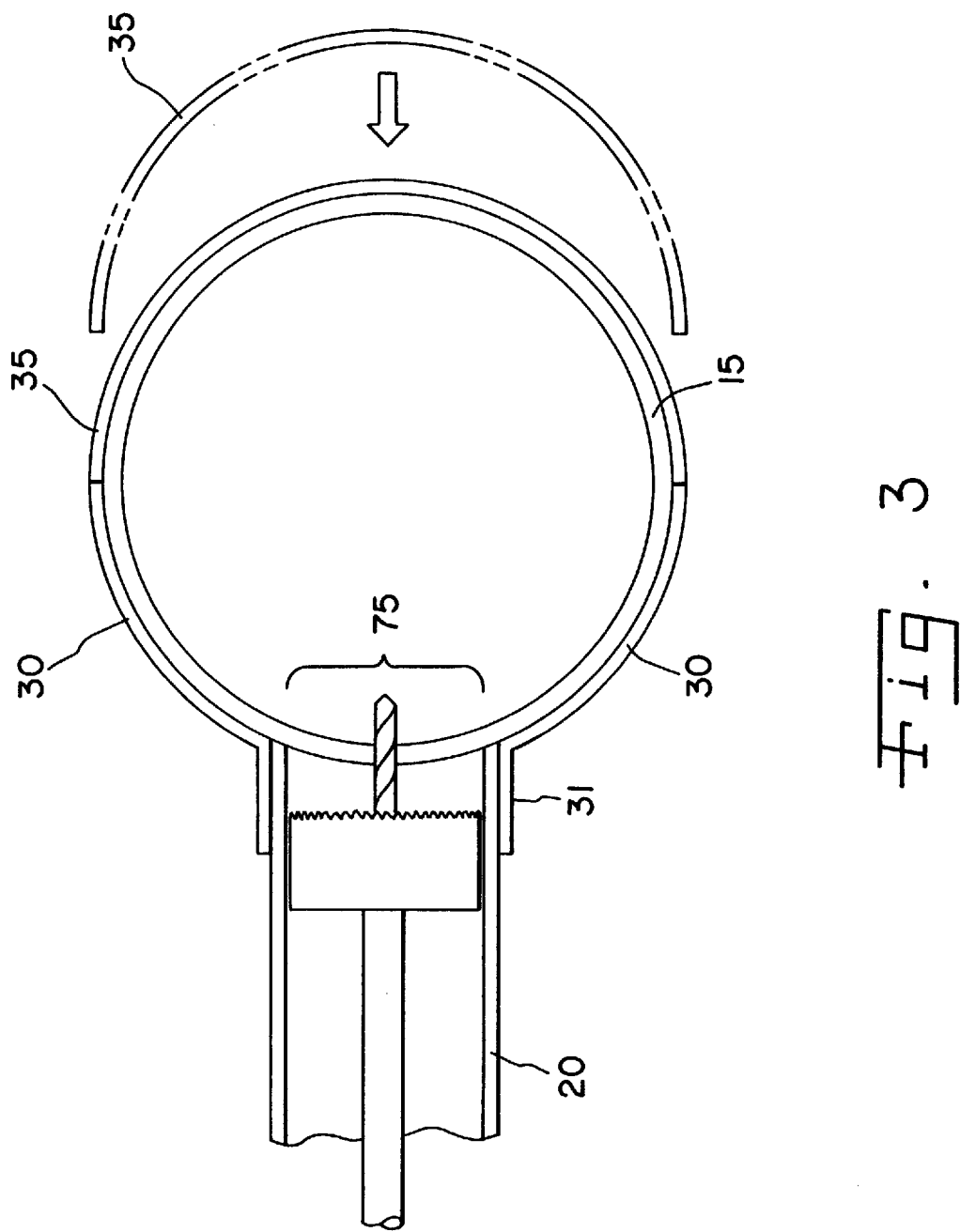

Next, with reference to FIGS. 2 and 3, a full opening valve 21 having a valve body 23 is connected to side branch pipe 20; then a flange 72 of a hot tap machine (not shown) is connected to valve 21 via valve flange 22. The design of this portion of the hot tap operation is conventional and is within the purview of a person skilled in the art.

As is known in the art, the hot tap cutting machine is a closed system which is not directly vented during the cutting operation. Next, a cutter 70 is inserted through side branch pipe 20 to cut a coupon 75 corresponding to the internal diameter of side branch pipe 20. As is conventional in the art, cutter 70 is designed both to cut and attach to coupon 75 thereby facilitating withdrawal of coupon 75 once cutter 70 is withdrawn from side branch pipe 20. Once cutter 70 been completely retracted, a valve operator 24 is actuated to close off valve 21. At this point, a valve operator (not shown) on the hot tap cutting machine may be vented and the machine is then disconnected from valve flange 22 of valve 21.

Conventional pipe may then be connected to valve flange 22 of valve 21 thereby completing the provision of side branch pipe 20. At this point, valve operator 24 may be actuated to open valve 21 to permit flow through side branch pipe 20.

The present inventors have discovered that the use of a solid, preferably resin, material in the gap between the reinforcing saddle and the main supply pipe/side branch pipe serves to significantly increase the load-bearing and strength properties of the hot tap connection. It is believed that hot tap connections produced in accordance with the present method will be permanent and not require replacement. This results in significant cost-savings and environmental benefits.

As will be appreciated by those of skill in the art, many variations of the disclosed process are possible without deviating from the spirit and substance thereof. Accordingly, while the invention has been described with reference to illustrative embodiments, the description is not intended to be construed in a limiting sense. Various modifications of the illustrative embodiments as well as other embodiments of the invention will be apparent to persons skilled in the art upon reference to this description. For example, the order of some of the process steps may be varied (e.g. pumpable material injection/curing may be the final steps in the process). It is therefore contemplated that the appended claims will cover any such modifications of embodiments.

What is claimed is:

1. A hot tap connection comprising: (i) a main supply pipe, (ii) a side branch pipe connected to the main supply pipe, (iii) a reinforcing saddle surrounding the main supply pipe and the side branch pipe, (iv) a first gap between the main supply pipe and the reinforcing saddle, (v) a second gap between the side branch pipe and the reinforcing saddle, and (vi) a solid material substantially filling the first gap and the second gap wherein the reinforcing saddle comprises at least one inlet through which a pumpable material can be infected into the first gap and the second gap for curing into the solid material and forming a tight seal therein, and at least one bleeder point in the vicinity of a junction between the side branch pipe and the main supply pipe in communication with the first gap and the second gap and configured for venting the pumpable material.

2. The hot tap connection defined in claim 1, wherein the reinforcing saddle comprises: a front half surrounding the side branch pipe and a first portion of the main supply pipe, and a back half surrounding a second portion of the main supply pipe.

3. The hot tap connection defined in claim 1, wherein the first gap is between the main supply pipe and the front half of the reinforcing saddle.

4. The hot tap connection defined in claim 1, wherein the second gap is between the side branch pipe and the front half of the reinforcing saddle.

5. The hot tap connection defined in claim 1, wherein the solid material has a compressive strength of at least about 10,000 psi.

6. The hot tap connection defined in claim 1, wherein the solid material has a resin material, optionally comprising a filler.

7. The hot tap connection defined in claim 1, wherein the side branch pipe is substantially perpendicular to the main supply pipe.

8. The hot tap connection defined in claim 1, wherein the reinforcing saddle comprises a pair of inlets and a pair of bleed points in the vicinity of a junction between the side branch pipe and the main supply pipe.

9. The hot tap connection defined in claim 1, wherein the edges of the front half of the reinforcing saddle are substantially sealed.

10. A method for producing a hot tap connection comprising the steps of:

(i) connecting a side branch pipe to a desired location on a main supply pipe;

(ii) surrounding the side branch pipe and the main supply pipe with a reinforcing saddle having at least one inlet and at least one bleeder point;

(iii) defining a first gap between the main supply pipe and the reinforcing saddle, and a second gap between the side branch pipe and the reinforcing saddle, the first gap and the second gap being in communication with the bleeder point;

(iv) injecting a pumpable material into the first gap and the second gap through the inlet until the pumpable material begins to exit from the bleeder point;

(v) curing the pumpable material to produce a solid material forming a tight seal;

(vi) cutting a coupon of the main supply pipe within the side branch pipe to produce an opening in the main supply pipe to allow gas to flow therethrough; and (vii) removing the coupon from the side branch pipe.

11. The method defined in claim 10, wherein Step (i) comprises welding the periphery of the side branch pipe to the main supply pipe.

12. The method defined in claim 10, wherein Step (ii) comprises affixing: a front half of the reinforcing saddle to surround the side branch pipe and a first portion of the main supply pipe, and a back half of the reinforcing saddle to surround a second portion of the main supply pipe.

13. The method defined in claim 10, wherein the at least one bleeder point is in the vicinity of a junction between the side branch pipe and the main supply pipe.

14. The method defined in claim 13, wherein Step (iv) comprises:

sealing the bleeder point;

continuing to inject the pumpable material through the inlet until the first gap and the second gap are substantially completely filled.

15. The method defined in claim 10, wherein the reinforcing saddle comprises a pair of inlets and a pair of bleeder points in the vicinity of a junction between the side branch pipe and the main supply pipe.

16. The method defined in claim 10, wherein Step (v) comprises chemically curing the pumpable material to produce a substantially solid material having a compressive strength of at least about 10,000.

17. The method defined in claim 10, wherein the pumpable material is an epoxy resin.

18. The method defined in claim 17, wherein the epoxy resin is a two part system comprising a resin part and a catalyst part which can be mixed to initiate chemical curing of the epoxy resin.

19. The method defined in claim 18, wherein the resin material contains a filler.

* * * * *

UNITED STATES PATENT AND TRADEMARK OFFICE
CERTIFICATE OF CORRECTION

PATENT NO. : 5,842,496
DATED : Dec. 1, 1998
INVENTOR(S) : Joseph Delanty, Burke Delanty, Trevor McFarlane It is certified that error appears in the above-identified patent and that said Letters Patent is hereby corrected as shown below:

Column 1

Line 13, delete "arise" and substitute --arises-- therefor.

Column 3

Line 63, delete "raked" and substitute --mixed-- therefor; and
Line 65, after "part" add --,--.

Column 5

Line 5, delete "infected" and substitute --injected-- therefor.

Signed and Sealed this

Thirteenth Day of July, 1999

Attest:

Attesting Officer

Q. TODD DICKINSON

Acting Commissioner of Patents and Trademarks